No. 744,460. PATENTED NOV. 17, 1903.
J. F. BATTLE.
LAWN SWEEPER.
APPLICATION FILED NOV. 22, 1901.
NO MODEL. 2 SHEETS—SHEET 1.
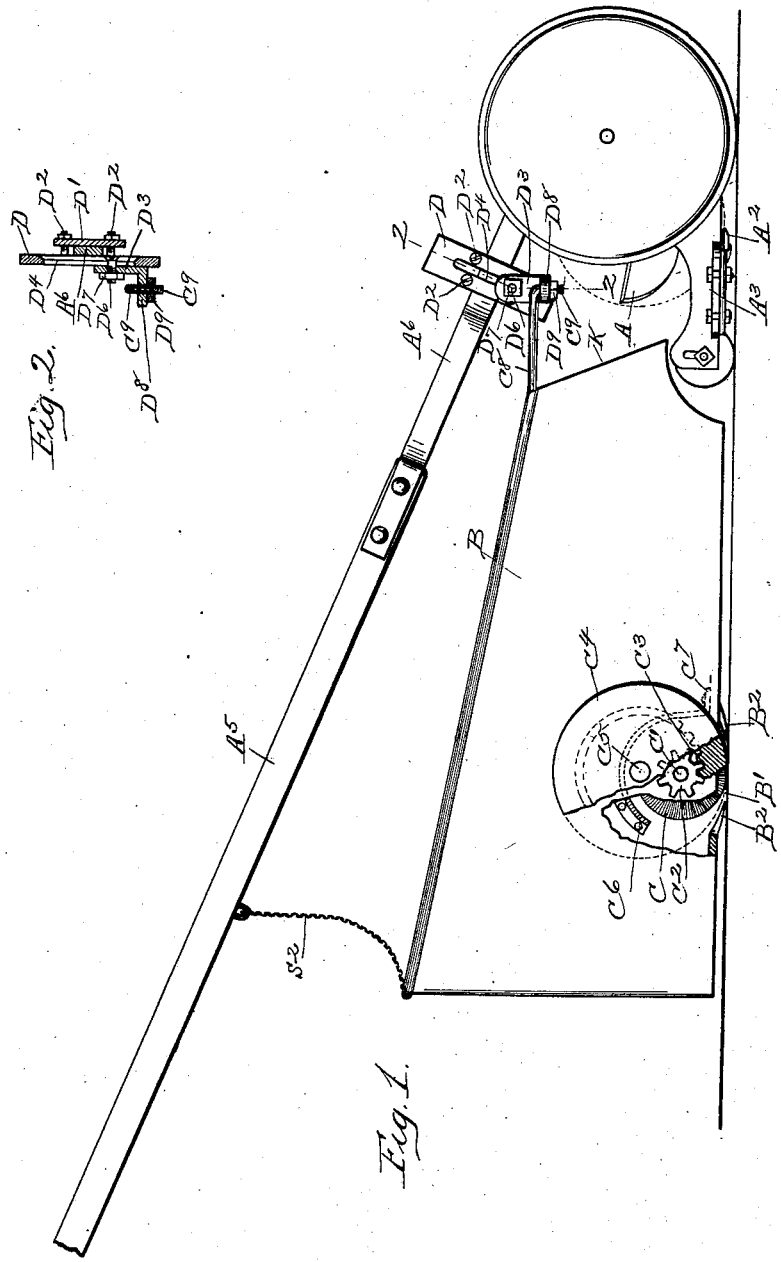
Witnesses:
E. M. O'Reilly.
M. Brodie.
Inventor:
John F. Battle.
By Mosher & Curtis
attys.

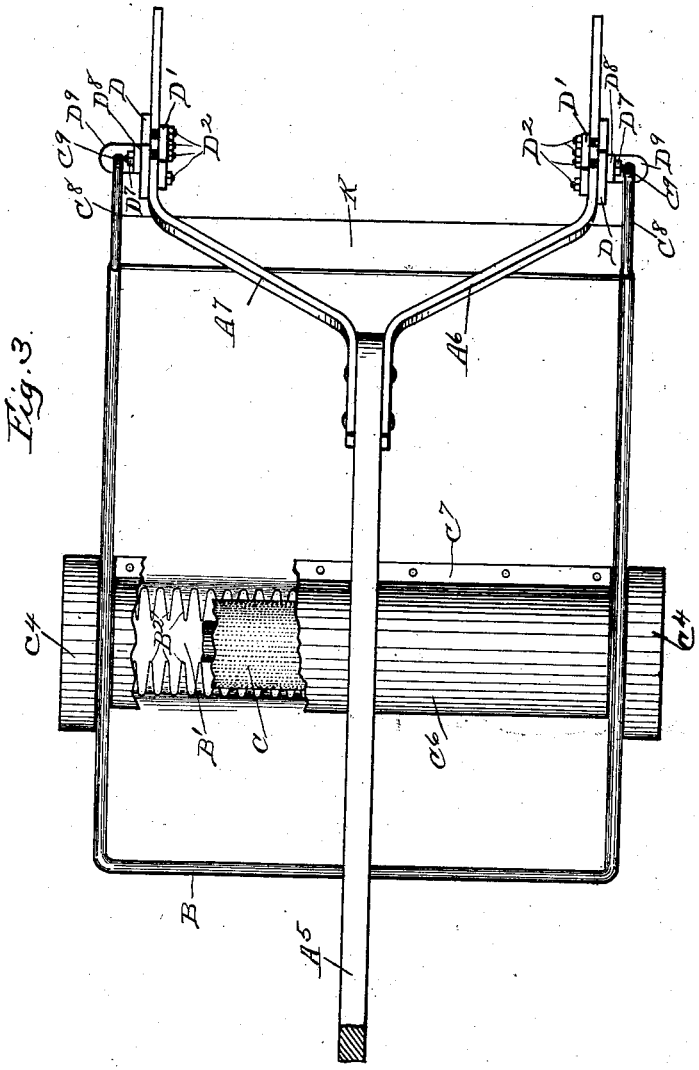
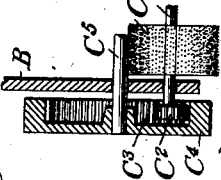

No. 744,460. Patented November 17, 1903.

UNITED STATES PATENT OFFICE.

JOHN F. BATTLE, OF SCHENECTADY, NEW YORK, ASSIGNOR TO HARRY J. BARTLE, OF COHOES, NEW YORK.

LAWN-SWEEPER.

SPECIFICATION forming part of Letters Patent No. 744,460, dated November 17, 1903.

Application filed November 22, 1901. Serial No. 83,251. (No model.)

*To all whom it may concern:*

Be it known that I, JOHN F. BATTLE, a citizen of the United States, residing at Schenectady, county of Schenectady, and State of New York, have invented certain new and useful Improvements in Lawn-Sweepers, of which the following is a specification.

The invention relates to such improvements; and it consists of the novel construction and combination of parts hereinafter described and subsequently claimed.

Reference may be had to the accompanying drawings, and the reference characters marked thereon, which form a part of this specification.

Similar characters refer to similar parts in the several figures.

Figure 1 of the drawings is a side elevation of my improved attachment secured to a lawn-mower. Fig. 2 is a cross-section taken on the broken line 2 2 in Fig. 1. Fig. 3 is a top plan view of the sweeping attachment and mower-handle with the mowing mechanism detached. Fig. 4 is a vertical section showing a portion of the box B, the shafts $C'$ and $C^5$, and one of the traction-wheels.

My improved attachment is adapted to be secured to different styles of lawn-mower. In the mower shown A is one of the revoluble cutting-blades; $A^2$, the stationary cutting-bar, secured to the frame $A^3$ in the usual well-known manner. The bifurcate handle comprises the wooden shaft $A^5$, clamped between the handle-arms $A^6$ and $A^7$.

My improved sweeping attachment comprises a box B, open at the top and closed at the bottom. The bottom is provided with a transverse opening $B'$, fringed on one or both sides, front and rear, with downwardly-projecting teeth $B^2$. Just above the transverse opening is placed a rotary brush C, provided with end journals $C'$, having bearings in the vertical walls of the box. Fixed upon the projecting end of one or both the journals is a pinion $C^2$, adapted to mesh with the internal gear $C^3$ on the traction-wheels $C^4$, mounted upon the projecting ends of a transverse shaft $C^5$, having bearings in the vertical box-walls. A shield or cover $C^6$ is secured at its forward edge $C^7$ to the bottom of the box on its inner side and projects over the top of the brush-roll to protect it from the contents of the box. As a means for attaching the box to the mowing mechanism I provide the box with the forwardly-projecting rods $C^8$, having on their forward ends each a downwardly-projecting hook $C^9$, and the handle-arms each with a clip having an eye adapted to receive one of the hooks $C^9$. As there are many different styles and forms of mowers, it is essential that ample adjustment should be provided in order that the trailing sweeper should be secured in the desired position with all styles of mowers.

The attaching mechanism shown comprises a plate D, secured to the handle-arm by means of the plate $D'$, and connecting-bolts $D^2$, having their heads countersunk in the plate, as shown, and the slide $D^3$, adjustably secured to the plate. The plate D is provided with a longitudinal slot $D^4$ with beveled walls $D^5$, adapted to receive the shank and head of bolt $D^6$. The bolt, with its countersunk head, is adapted to slide vertically past the arm and the whole length of the slot, and the slide is held in any desired vertically-adjusted position on the plate by means of the nut $D^7$ on the threaded end of bolt $D^6$. Since the plate D is secured to one of the arms by means of the plate $D'$ and bolts $D^2$, it can be adjusted to any desired position on such arm, thereby providing a universal adjustment of the slide. The slide is provided with the horizontal offset $D^8$, containing the eye adapted to receive the hook $C^9$. The end of the hook is screw-threaded to receive the nut $D^9$, by which the hook is held in place. I am thus able to secure the sweeping attachment to differing forms of mowers in proper relation to the mowing mechanism of each, so that the particles of grass severed by the knives of the mower will for the most part be thrown over into the box of the sweeping attachment and that the bottom of the box will be maintained in a position approximately parallel with the ground, the surface of which is indicated by the line S. Those portions of the severed grass which are not thrown over into the box by the blades are swept up and forced into the rear end of the box by the rotary brush. The operation is facilitated by the downwardly-projecting teeth on the sides of the brush-opening. The teeth on the forward side of the opening serve to separate and distribute any tufts or bunches of severed grass, and those on the rear side lift the grass up into engagement with the brush.

The contents of the box is dumped therefrom by tipping the handle forward over the mowing mechanism, so that the box will be inverted.

When desired, the rear end of the box may be loosely connected with the handle by a slack chain or cable $S^2$, as shown in Fig. 1, to relieve the hooks $C^9$ from too great strain when inverting the box.

The forward end of the receptacle is inclined, as shown at K in Fig. 1, from a point just in rear of the path of rotary movement of the knives upwardly and rearwardly to facilitate the delivery of the severed grass from the knives to the receptacle.

What I claim as new, and desire to secure by Letters Patent, is—

1. In a sweeping apparatus, the combination with a receptacle for the sweepings having a transverse brush-opening in its bottom; and means for propelling the same along the surface to be swept, of a rotary brush projecting down through the brush-opening; brush-supporting bearings; receptacle-supporting traction-wheels; gear connections between the wheels and rotary brush; and a series of teeth projecting forwardly and downwardly from the rear wall of the brush-opening, substantially as described.

2. In a sweeping apparatus, the combination with a receptacle having a transverse brush-opening in its bottom, and means for propelling the same, of a brush rotary in the brush-opening; traction-wheels; gear connections between the wheels and brush; and a series of teeth projecting rearwardly and downwardly from the front wall of the brush-opening, substantially as described.

3. The combination with the receptacle of a sweeping attachment, and a projecting hook thereon, of a universally-adjustable attaching mechanism consisting of a longitudinally-slotted plate having the slot-walls beveled; a clip-plate and securing-bolts whereby the slotted plate may be secured to a supporting-arm transversely thereof; a slide adjustably connected with the slotted plate by a countersunk bolt passing through the slot; and an offset on the slide containing an eye adapted to receive the hook; and means for securing the hook within the eye, substantially as described.

In testimony whereof I have hereunto set my hand this 9th day of November, 1901.

JOHN F. BATTLE.

Witnesses:
FRANK C. CURTIS,
E. M. O'REILLY.